United States Patent [19]

White, III

[11] 4,117,319

[45] Sep. 26, 1978

[54] ALIGNMENT SYSTEM FOR LASERS

[75] Inventor: Frederic H. White, III, Simi, Calif.

[73] Assignee: Rockwell International Corporation, El Segundo, Calif.

[21] Appl. No.: 812,884

[22] Filed: Jul. 5, 1977

[51] Int. Cl.² .............................................. G01J 1/20
[52] U.S. Cl. .................................... 250/201; 356/141
[58] Field of Search ....................... 250/201, 202, 216; 356/141, 152; 350/6, 7

[56] References Cited

U.S. PATENT DOCUMENTS 3,579,140  5/1971  Anderson et al. ..................... 250/201
3,739,174  6/1973  Gloge .................................... 250/201

Primary Examiner—David C. Nelms
Attorney, Agent, or Firm—L. Lee Humphries; Robert M. Sperry

[57] ABSTRACT

The system to be aligned includes a concave spherical reflector confocal with a convex mirror which is mounted together with a scraper mirror on a common support. The concave mirror is pivotally mounted for tilting about axes extending transversely to the optical axis of the cavity and it includes a spherical extension. The scraper mirror and the convex mirror are mounted for common tilting about axes extending transversely to the direction into which the laser beam is directed by the scraper mirror. Two autocollimation systems include a collimating flat on the support as well as a diverging-recollimating system thereon, the latter being optically aligned with the spherical mirror extension both systems monitor misalignment of the axes of the mirrors, and cause corrective tilting, whereby specifically translational and rotational misalignment of the concave mirror is corrected by tilting.

13 Claims, 4 Drawing Figures

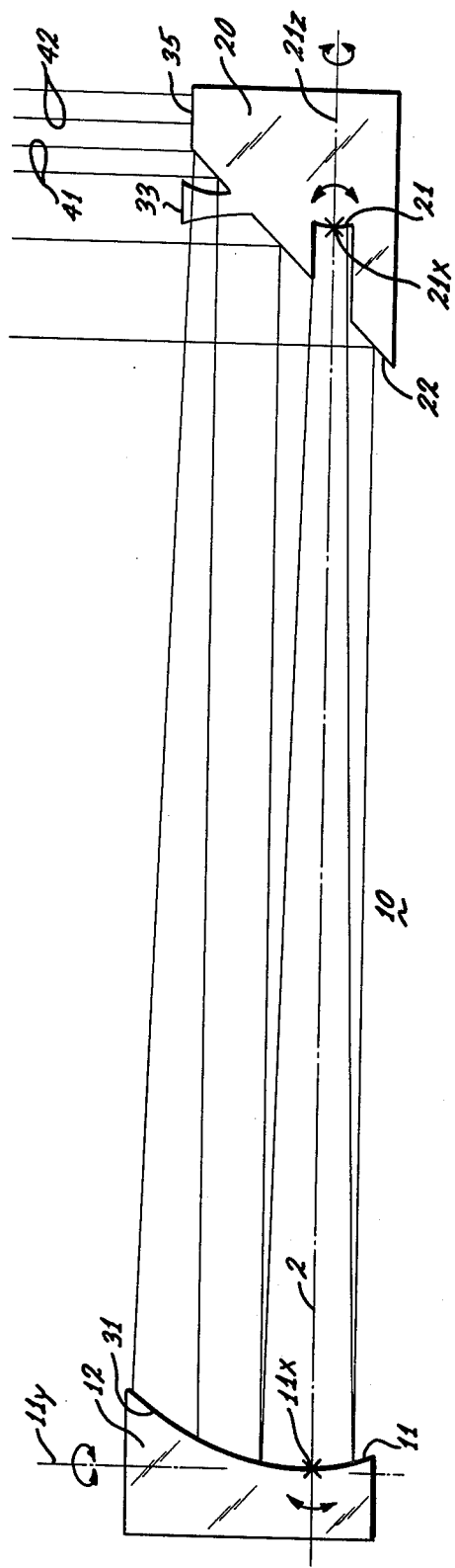
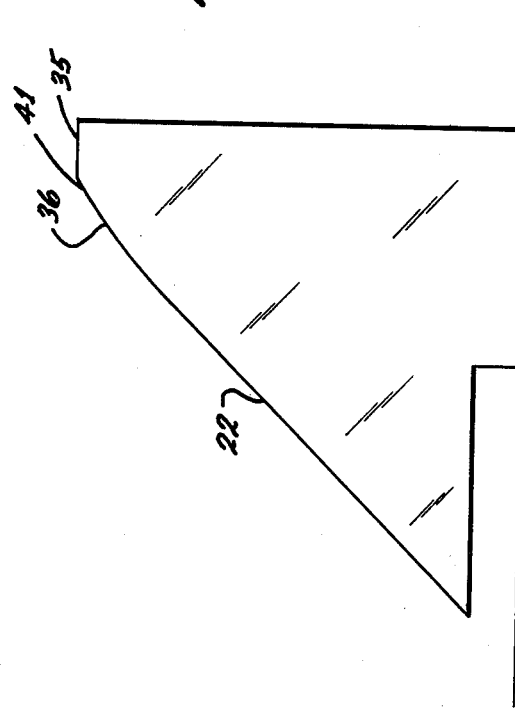

ALIGNMENT SYSTEM FOR LASERS

The invention herein described was made in the course of or under a contract or subcontract thereunder, (or grant) with the U.S. Army.

BACKGROUND OF THE INVENTION

The present invention relates to an alignment system for the reflectors in a laser cavity.

High energy laser systems have the requirement of maintaining the physical orientation of their optical elements to within microradian tolerances. However, the environment in which the optical elements reside may impart upon them severe vibrations. This is, for example, the case in a chemical laser in which the laser medium is fluid-dynamically and thermodynamically established, maintained and replenished. Moreover, the gases involved pass through the laser cavity at supersonic speeds so that, indeed, physical movement of the several parts of the system over a wide range of frequencies is more or less inevitable. The alignment problem involves specifically the mutual alignment of the reflectors defining the optical oscillator. However, the laser cavity is quite "noisy" so that utilization of active optical sensing in the laser cavity is more or less impossible.

DESCRIPTION OF THE INVENTION

It is an object of the present invention to provide a new and improved alignment system for the reflectors of a laser.

It is a specific object of the present invention to provide a new and improved system for an auto alignment system in a laser in which the positions of the microns are corrected with regard to translatory as well as rotational alignment errors.

It is another specific object of the present invention to improve the mutual alignment of the reflectors in an optical laser cavity which includes a system of convex and concave mirrors as well as a scraper mirror for laser beam extraction.

In accordance with the preferred embodiment of the present invention, the concave mirror of the laser reflector system is mounted for pivoting or tilting about two axes which extend transversely to the optical laser axis, the mirror furthermore has a concave extension of itself which extends outside the laser cavity. As a consequence, this reflector extension responds to rotational as well as translatory alignment errors. The convex mirror of the laser reflector system is rigidly combined structurally with the scraper mirror, and this unit is mounted for tilting about two axes extending transversely to the optical axis as reflected out of the system by the scraper mirror. This mirror mounting unit has two reflecting surfaces, one being an autocollimating flat that extends parallel to the two tilt axes of the mount for autocollimation of an incident reference beam. The other reflecting surface directs a second beam towards the concave mirror extension for being returned by it and by the reflecting surface as an autocollimated beam. This other reflecting surface is either concavely curved or cooperates with a negative lens system to direct a slightly diverging beam towards the concave mirror extension and for recollimating the returned beam. The two returned reference beams are individually tested as to autocollimation and any deviation is used to control the tilt positions of the two mounts. The control operates in particular in such a manner that the concave mirror i controlled by means of tilting to be realigned with th other unit on account of translational and/or rotationa alignment errors, while the latter unit maintains th orientation of the output beam.

It should be realized that vibrations, etc., affecting th reflectors and their relation to each other, can be re garded always as being composed of translatory com ponents of displacement and rotational components o displacement. Even though the reflectors bounding th optical oscillator cavity will undergo such deflection individually, the primary concern is any displacemen of the reflectors in relation to each other. The inventiv system takes care of this aspect by slaving one of th mirrors to the other one so that synchronously occur ring, lateral displacements are not compensated or onl to the extent of any differential between them. More over, such lateral displacements are corrected rotation ally by satisfying the condition that the control mus restore an orientation of the optical axis of one of th laser mirrors so that its axis traverses the center of th respective other mirror.

DESCRIPTION OF THE DRAWINGS

While the specification concludes with claims partic ularly pointing out and distinctly claiming the subjec matter which is regarded as the invention, it is believe that the invention, the objects and features of the inver tion and further objects, features and advantage thereof will be better understood from the followin description taken in connection with the accompanyin drawings in which:

FIG. 2 is a schematic side view of the reflectors ir volved in the inventive system;

FIG. 3 is an enlarged side view of the convex mirrc and scraper mirror unit with additional optical element for reference beams used to determine alignment error and FIG. 4 is a modification of the unit shown in FIG.

Figure 1:
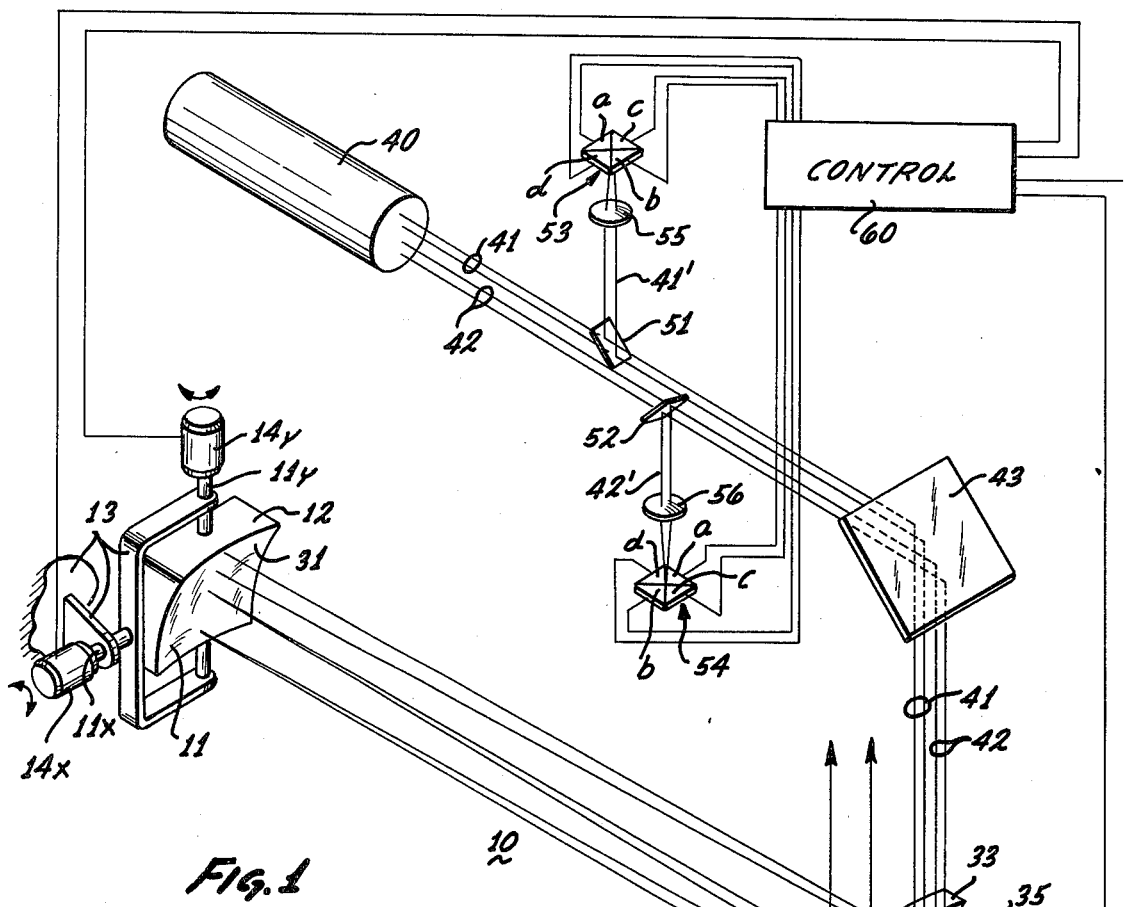
FIG. 1 is a schematic perspective view of a syster incorporating an example of the preferred embodimer of the invention.

Proceeding now to the detailed description of th drawings, the figures illustrate a laser cavity 10 whic contains a laser active medium. For purposes of descrit ing and practicing the invention, it is quite immateri what the laser active medium consists of, it could be gas or a chemical laser or a solid state laser of know configuration. However, the operational misalignmer problem occurs most dominantly in chemical lase using a gaseous laser medium.

The laser cavity 10 constitutes also an optical oscill tor cavity by operation of three reflectors or mirrors. . first, spherically concave mirror 11 establishes one sic or one end of the optical laser cavity. The other end the cavity is bounded by a convex mirror 21 being co focal with mirror 11. The mirror 21 is inserted, so speak, optically as well as physically, within the ape ture of a scraper mirror 22, having an orientation of 4 to the common optical axis Z of mirrors 11 and 21. T mirror 22 is provided to couple out of the cavity a bea of radiation which is, in fact, the radiation output of t laser.

The mirror 11 is mounted in a suitable support which, in turn, is mounted in a stand 13, but in a mann permitting minute pivotal displacement of mount about two axes 11x and 11y, both running through t optical center of the reflector 11; axis 11x extends trar versely to the plane of the drawings of FIG. 2; axis 11y extends in the plane of the drawing but transversely to the optical axis Z of the laser cavity.

Adjusting devices 14x and 14y provide for pivoting and tilting of the holder 12 and of the reflector 11 about the two axes 11x and 11y, respectively. The actuators 14x and 14y tilt the mount 12 about the respective axes independently from each other and in response to control signals derived in a manner to be described below. These actuators are shown only schematically and are of known construction; examples are disclosed in U.S. Letters Patents to T. Heinz of common assignee, Ser. No. 593,357, filed July 7, 1975, and Ser. No. 700,430, filed June 28, 1976.

The two mirrors 21 and 22 are mounted to a solid support structure 20 which is itself mounted in a stand 23, in a manner which permits rotational adjustment of unit 20 about two axes 21x and 21z. Both axes run through the center of the reflector 21; axis 21x runs perpendicularly to the plane of the drawing of FIGS. 2 and 3, and axis 21z coincides (or should coincide) with optical axis Z of reflector 11. Particularly, the two axes 21x and 21z extend transversely to the direction Z' into which the optical axis Z is (hypothetically) reflected by scraper mirror 22. Adjusting devices 24x and 24z provide for controlled pivoting of the support structure 20, respectively, about these axes 21x and 21z.

It can, thus be seen that the optical elements of the laser cavity are individually adjustable through rotation about two right-angle axes in each instance. The two actuators 14x, 14y, operating concave mirror 11 on one hand, and the two actuators 24x, 24z, operating mirror assembly 21 and 22 on the other hand, keep mirror 11 aligned with mirror 21, and mirror 22 is properly oriented with reference to mirror 11 and the desired output beam direction. The operation of these actuating devices permits, in fact, correction of translatory as well as rotary misalignment of the concave mirror 11 in relation to mirror 21; translatory misalignment is corrected by rotational control. This may not restore coaxial relationship between the optical axes of the two reflectors 11 and 21, but rotational alignment of mount 12 will re-orient axis Z (of reflector 11) to intersect the center of reflector 21. The selection of the control and pivot axes has been made so that any residual misalignments become second or higher order errors which can be neglected. As far as unit 20 is concerned, only rotational alignment errors are of interest and corrected.

In order to detect the need for realignment, i.e., in order to detect alignment errors, the system is augmented by the following detection and sensing system. The concave spherical mirror 11 has an extension 31 which is, in effect, a continuation of mirror 11 as far as the optical characteristics thereof is concerned. That is to say the spherical extension 31 has the same focal point as the reflector 11 as well as the same optical axis as far as its orientation and position as an optical element is concerned. However, extension 31 is located outside of the laser cavity and does not participate in the reflection of the laser beam.

Figure 3:
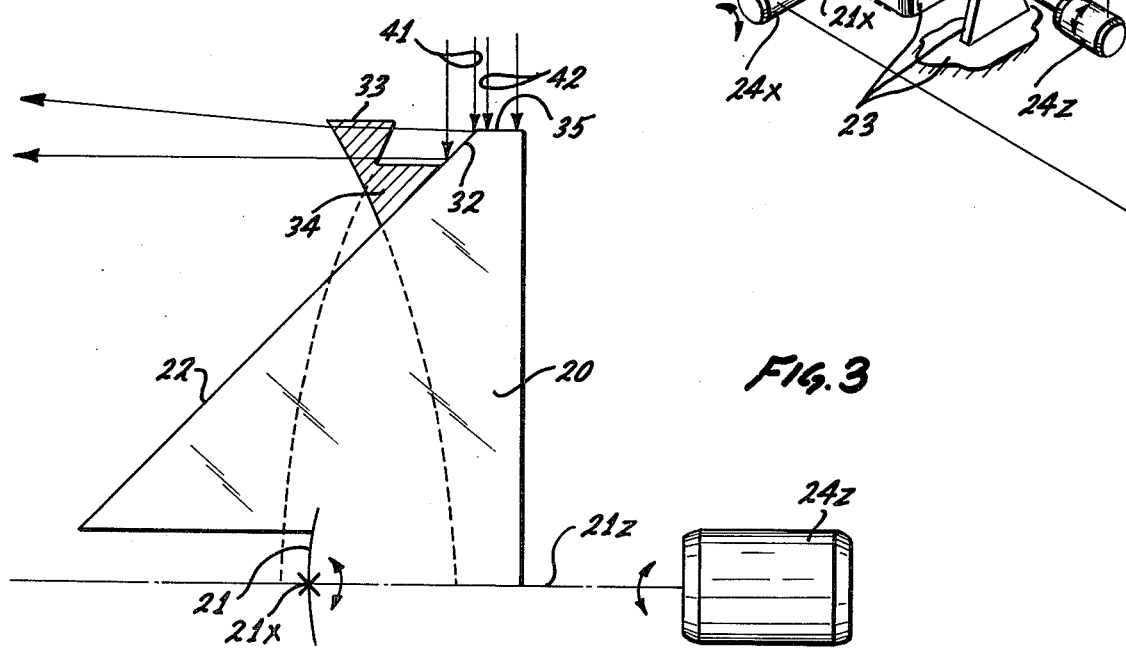

The block or unit 20 has a continuation 32 of the scraper 22 mirror but being located also outside of the laser cavity; that is to say, the portion 32 does not participate in the deflection of the laser output beam. In addition, unit 20 is provided with a lens section 33 which is a negative element and is disposed in front of reflecting surface 32. FIG. 3 shows that section 33 in greater detail. It has a mounting portion 34 for disposition and affixing to the oblique surface of block 20, carrying the mirrors 22 and 32. Section 33 can be understood to be a section of an (otherwise hypothetical) annular lens which extends around the axis 21 Z. Therefore, this lens section 33 is constructed to have the same optical axis as the laser cavity elements as well as extension 31, as long as axes 2 and 21 Z are aligned. The focal point of lens section 33 is chosen to be situated in the center of curvature of the concave mirror 11. Section 33 as a negative element is needed to decollimate and recollimate reference beam 41, because the principle reflector of this autocollimation system, 31, is particularly curved to permit the correction of translational and rotational alignment errors of mirror 11 just by corrective tilting. The two extensions and element sections, 31 and 33, are optically aligned outside of but parallel to the laser cavity.

In addition, device 20 has a flat reflector 35 basically being oriented to extend parallel to the axis 21 Z as well as parallel to the control and tilt axis 21x, but transversely to axis Z'. It is important that the mutual orientation of the elements 22, 23, 33, and 35 to each other remains invariant on account of rigid mounting and support body 20. Any tilting unit 20 undergoes affects these elements in unison.

The optical elements 31, 32, 33, and 35 together define the position and mutual orientation of the reflectors 11, 21, and 22, with respect to each other. A misalignment between reflector 11 and reflectors 21 and 22 will be detected by detecting the deviation these elements produce on two autocollimation beams. For this the following auxiliary optical elements are provided.

A laser source of suitable configuration provides two sensing or reference beams 41 and 42 of comparatively low power output and preferably at a very different frequency from any of the frequencies of the laser action in cavity 10. These beams are, in effect, just separate portions of the output of a laser 40. They have, therefore, parallel optical paths. The beams 41, 42, are reflected by a stationarily mounted reflector 43 which directs them towards the surfaces 32 (beam 41) and 35 (beam 42). Autocollimated beams (41', 42') are returned by the surfaces 32 and 35 towards mirror 43. Therefore, the optical elements 31, 32, 33, and 35 provide for autocollimation of each of the two reference beams provided the mirrors 11 and 21 have the desired orientation. Any deviation disturbes the autocollimation of one or the other of the two beams 41 and 42, as will be described more fully below.

A pair of beam splitters 51 and 52 is provided at an orientation which permits the outgoing beams 41 and 42 to propagate substantially unimpeded towards reflector 43. The return beams 41', 42', are at least in parts reflected out of the collimation path and towards two autocollimation detectors, 53 and 54. Autocollimation detectors are well known; each of them is usually comprised of, basically, four detectors arranged symmetrically and in an array in relation to a center. Array 53 includes four detectors, 53a, b, c, d, and array 54 includes four detectors 54a, b, c, d.

Lenses 55 and 56, respectively, focus the return beams 41', 42', they receive from the splitters 51 and 52, and for proper adjusting conditions in the laser cavity, the beams will be focussed right in the center of each of the two detectors. Each of the beams being incident upon the respective detector array affects all four detectors of the array equally in the case of true autocollimation.

The detection axes of the detectors, i.e., the axes along which respective two oppositely disposed detectors are aligned, represent particular lateral deflections a beam has undergone before being returned. Thus, the two beams 41 and 42 provide separate monitoring actions for the two mirror or mirror systems of the laser cavity in the following manner.

The beam 41 as reflected by the mirror 43 towards surface 32 is reflected by 90° and passes through lens section 33. The (still) collimated beam, therefore, assumes a diverging contour but upon being reflected by the spherical mirror portion 31, the beam assumes a converging contour. As the returned beam passes again through lense section 31, the beam is recollimated and returned (beam 41') by the surface 32 for purposes of being monitored by the autocollimation detector 53. Any displacement of the mirror 11 disturbs the autocollimation and will, in fact, result in a lateral deflection of the focussed return beam 41' in the plane of detector array 53.

Specifically, any tilting of concave mirror 11 about axis 11y or any lateral displacement of the mirror in the direction of axis 11x will cause the return beam 41' to be deflected in a direction that unbalances the two detectors 53c, d. Any tilting of mirror 11 about axis 11x or a lateral displacement in the direction of axis 11y causes return beam 41' to be deflected in a direction to unbalance detectors 53a, b. The detector 53 has four output lines commensurate with the four detector elements a through d. The output signals in these lines vary in pairs in that for a deflection of the focussed return beam 41' in one direction, the output of one detector goes down and the output of the respective oppositely positioned one goes up.

These output signals are fed to a control circuit 60 which provides control signals to the drives 14x and 14y to obtain corrective tilting of mount 12 for reflector 11 until the concurring repositioning of mirror extension 31 restores true autocollimation for beams 41, 41'.

It should be realized that any particular unbalance of a pair of detector cells may be due to a particular misalignment alignment correction or due to a lateral displacement. The same quantitative control action is instituted causing the mount 12 to be tilted by a particular angle, even if the detected error was a lateral deflection. The fact that reflector 31 is an extension of the spherical reflector 11 is directly responsible for the result that the corrective tilting in that case produces a realignment in the sense that the (laterally displaced) optical axis of reflector 11 is tilted so that it again traverses the center of convex reflector 21. Even though the axes of the two reflectors are still misaligned, an correction has been produced which causes again the axis Z of concave mirror 11 to traverse the center of convex mirror 21, and that is quite sufficient. It is for this reason that both types of alignment errors, translational and rotational, can be corrected rotationally.

It should be realized that any relative change by the unit 20 as far as its orientation is concerned, does not influence this particular beam 41, 41', as far as the collimating process is concerned. For example, a tilt of unit 20 about the Z axis merely rotates lens section 33 about its own center axis, with no optical effect as far as its function is concerned. Any slight tilt of body 20 about axis 21x or about an axis extending parallel to axis Y affects beam 41 twice, and therefore, does not disturb the autocollimation process for the inspection beam 41.

Another point of interest is that any concurring lateral displacements of mirror 11 and unit 20 in either the Y or in the X directions, are not detected, while any lateral displacements of unit 20 (transverse to axis Z and relative mirror 11) is detected as an alignment error of mirror 11, causing corrective tilting of holder 12. Thus the system responds to translatory displacements of mirror 11 and unit 20 relative to each other, and the reflector 11 is, indeed, slaved to the reflector 21. Correction of the orientation of mirror 11 always causes its axis Z to intercept again the center of mirror 21.

It should also be realized that the various curvatures illustrated, particularly with regard to mirror 31 and section 33 are greatly exaggerated for explanatory purposes. In reality, the curvature is a very slight one, indeed. The two systems 31 and 33 are physically aligned along an axis that is laterally offset from this common optical axis which is the axis of the laser cavity, and the beam 41 remains outside of the optical laser cavity.

As far as the second beam 42 is concerned, the situation is different. The beam meets the surface 35 directly at a 90° angle of incidence, provided the structure 20 has the desired position, and without additional optical processing, the beam bounces back as return beam 42' towards the detector 54. Any angular displacement of the device 20, however, will cause the reflected beam to be deflected laterally to its own axis; autocollimation is disturbed and the detector 54 senses magnitude and direction of that disturbance. Any rotational deflection of block 20 about axis Z or 21z causes return beam 42' to be deflected to unbalance detector 54a, b, and any tilting of block 20 about axis 21x causes return beam 42' to be deflected to unbalance detectors 54c, d.

The detector array 54 has also four output lines and the autocollimation conditions for beam 42 as well as any deviation is reflected in balanced or imbalanced output signals. These output signals are also fed to control circuit 60 which operates the drives 21x and 21z to obtain tilting adjustment of body 20 for restoring any autocollimation misalignment so that the unit 20 is restored to proper position on the laser cavity.

It can also be seen that the mirrors are being prealigned individually outside of the laser cavity. This is particularly true with regard to the assembly of the various reflectors on body 20. They will be assembled with reference to the two tilt axes of this body. Unit 20 is then placed into the laser cavity so that its axis 21 intersects the center point or mirror 11. One can also say that the concave mirror 11 and unit 20 are mounted in relation to each other so that the optical axis of each traverses the center of the respective other mirror which is also the center point where the respective tilt axes intersect in either case. A key feature of the assembly is that the center line of lens section 33 becomes situated on that common optical axis Z-21Z so that the focal point of lens section 33 coincides with the center of tilting of the spherical mirror 11,31. This is accomplished by the rigid mounting of the several optical elements on unit 20, and by prealigning the mounts 12 and 20 to each other in the laser cavity to meet that criterion. This assembly establishes the requisite diverging and recollimating function for the lens section 33, as cooperating with the spherical extension 31, so that in particular translational misalignment can be corrected rotationally. The established basic and initial alignment of the mirrors 11 and 12 with respect to each other i subsequently mainted dynamically by operation of the control loops as described.

The particular segment 33-34 is shown to be attached to a generally oblique support surface of body 20 which carries the two mirrors 22 and 32. The reflector 35 is separately attached to body 20. Instead, one could make reflector 35 a part of the lens section, using any available surface. The particular position relation between beams 41 and 42 is not mandatory, each can be to either side of the respective other one.

FIG. 3 illustrates a modification of the device shown in FIGS. 1 and 2. The modification involves specifically the reflection and optical interaction of beam 41 on body 21. Specifically, the negative element 33 and the mirror 32 have been replaced by a section 36 of a parabolic mirror which combines the decollimation/recollimation function of element 33 with the 90° deflection of mirror 32. This element 36 is, or course, attached to body 20 and may be built into or otherwise attached to the scraper mirror 22. This particular embodiment is somewhat simpler to implement which may be helpful, particularly for long laser cavities and large distances between the reflectors 11, 21.

The invention is not limited to the embodiments described above but all changes and modifications thereof not constituting departures from the spirit and scope of the invention are intended to be included.

I claim:

1. In a laser having a laser cavity which includes a convex mirror and a concave mirror mounted for alignment of their respective optical axis, the concave mirror being mounted in addition for tilting about two axes extending transversely to the optical axis of the concave mirror, the improvement comprising:
    a concave extension of the concave mirror;
    means for providing a collimated beam;
    means including beam diverging means for directing the beam towards the concave mirror extension to be reflected by the extension and recollimated by the diverging means;
    detection means disposed to be responsive to the recollimated beam to detect any displacement thereof from autocollimation on account of a relative lateral or tilting displacement between said mirrors and providing detection signals accordingly; and
    control means connected to the detection means for being responsive to the detection signals for correctively tilting the concave mirror.

2. In a laser as in claim 1, wherein the beam diverging means are mounted to the convex mirror.

3. In a laser as in claim 2, the diverging means being a negative lens section having a focal point in the center of the concave mirror.

4. In a laser as in claim 2, the diverging means being a convexly curved reflector.

5. In a laser as in claim 1, including laser beam redirecting means mounted together with the convex mirror in a common mount; a collimation flat on the mount; a second collimated beam and autocollimation detector means cooperating with the flat to detect tilting misalignment of the common mount; and control means coupled to the latter detector means to correct tilting of the mount.

6. In a laser having a laser cavity containing a laser active medium and being bounded by a concave mirror cooperating with a convex mirror and scraper mirror, the improvement comprising:

said concave mirror having an extension defining a reflector having the same optical axis and focal length as the concave mirror itself;
    means for mounting the concave mirror permitting pivoting about two transverse axes extending transversely to the optical axis;
    a support for mounting said convex mirror and said scraper mirror and having a particular flat reflective surface which extends parallely to the optical axis of the laser, said support provided for pivoting about two transverse axes, extending transversely to the direction along which the scraper mirror reflects the laser beam;
    first means for directing a first collimated beam towards the extension of the concave mirror, and including decollimating means so that the beam as returned by the extension and as passing through the decollimated means is recollimated;
    first detection means disposed to be responsive to detect autocollimation of the recollimated beam and to provide control signals representative of any deviation from autocollimation;
    first control means connected to the first detection means to be responsive to the control signals for tilting of the concave mirror about said two axes of pivoting of the concave mirror with a center of the convex mirror;
    second means for directing a second collimated beam towards the flat surface to obtain autocollimation;
    second detector means disposed to be responsive to the second autocollimated beam to detect any deviation from autocollimation and to provide control signals for tilting the support about the two axes of pivoting of the support; and
    second control means connected to be responsive to the control signals by the second detection means for tilting the support mount to obtain and maintain a particular alignment thereof.

7. In a laser as in claim 6, said decollimating means including a negative lens section.

8. In a laser as in claim 6, said decollimating means including a convex mirror.

9. In a laser having a laser cavity which contains a laser active medium and which is bounded by a pair of reflectors, being in particular alignment to each other, the reflectors each being mounted to permit relative position adjustment, the combination comprising:
    a pair of collimated reference beams;
    reflection means connected to the reflectors of the pair and being disposed outside of the laser cavity but being rigidly connected to the reflectors of the pair, for respectively returning the collimated reference beams for establishing autocollimation when the reflectors of the pair have the desired position;
    detection means disposed to be responsive to the returned beams for determining any deviation from autocollimation; and
    control means connected to the detector means for controlling the adjustment position of the reflections of the pair.

10. In a laser having a laser cavity bounded by a pair of reflectors, a first one thereof being concave, a second one thereof being convex, the improvement comprising:
    an extension of the concave reflector having the same curvature, a common focal point, and a same common optical axis;

means for mounting the concave reflector and the extension for pivoting about two transverse axes being also transverse to the optical axis of the concave reflector and its extension;

optical means rigidly coupled to the convex reflector, the convex reflector being disposed on said optical axis, so that said optical axis passes through a center of the convex reflector, the optical means being constructed for directing an originally collimated beam as diverging beam towards the extension and recollimating a reflection of the diverging beam;

autocollimation detection means disposed to be responsive to the recollimated beam; and control means connected to be responsive to the output of detection means for pivoting the concave reflector to cause the optical axis thereof to pass through the center of the convex reflector.

11. In a laser as in claim 10, said optical means including means for providing a collimated reference beam, and a negative lens section intercepting the reference beam and having a focal point on the center of the concave reflector.

12. In a laser as in claim 10, said optical means including means for providing a collimated reference beam, and parabolic mirror, intercepting the reference beam and having a focal point on the center of the concave reflector.

13. In a laser as in claim 10, said convex reflector and a portion of said optical means as directing a diverging beam towards the concave reflector extension being mounted on a common support; reflecting means on the common support for directing a laser output beam out of the cavity; means for mounting the support, for pivoting about two axes extending transversely to a direction of the directed laser beam; autocollimation means including a flat reflecting surface on the support to determine the orientation of that support; and control means connected to the autocollimation means to pivot the support for maintaining a particular direction of the output beam.

* * * * *